United States Patent [19]

Ortiz et al.

[11] Patent Number: 5,655,724
[45] Date of Patent: Aug. 12, 1997

[54] AUTOREVERSE CASSETTE TAPE MECHANISM WITH TAPE-EATING PREVENTION

[75] Inventors: Edmundo Ortiz; Alfonso Molinar; Mario Alberto Solano, all of Chihuahua Chih, Mexico

[73] Assignee: Ford Motor Company, Dearborn, Mich.

[21] Appl. No.: 586,111

[22] Filed: Jan. 16, 1996

[51] Int. Cl.⁶ .................................................. G11B 15/00
[52] U.S. Cl. ........................................................... 242/333
[58] Field of Search .............................. 242/333, 333.1, 242/333.6, 352.2; 360/74.1, 74.2

[56] References Cited

U.S. PATENT DOCUMENTS

| | | | |
|---|---|---|---|
| 3,684,209 | 8/1972 | Wada | 242/333 |
| 4,147,898 | 4/1979 | Tozune et al. | |
| 4,210,944 | 7/1980 | Fushimi et al. | 360/74.2 |
| 4,238,808 | 12/1980 | Tomita | 242/333.6 |
| 4,256,274 | 3/1981 | Schatteman | 242/333 |
| 4,301,483 | 11/1981 | Santoro | |
| 4,341,364 | 7/1982 | Maddaloni | |
| 4,386,380 | 5/1983 | Ueki | |
| 4,511,103 | 4/1985 | Hayashi et al. | 242/333.6 |
| 4,591,932 | 5/1986 | Aratani | 360/74.1 |
| 4,604,662 | 8/1986 | Ida et al. | 360/74.1 |
| 4,646,174 | 2/1987 | Hayashi et al. | 242/333.6 |
| 4,720,752 | 1/1988 | Antonello | |
| 4,723,184 | 2/1988 | Takai et al. | |
| 4,736,905 | 4/1988 | Kido | 242/333.6 |
| 4,763,209 | 8/1988 | Lee | |
| 4,843,499 | 6/1989 | Ogawa | |
| 4,932,605 | 6/1990 | Klos-Hein et al. | 360/96.4 |
| 4,956,731 | 9/1990 | Yoshimura | 242/333 |
| 5,006,941 | 4/1991 | Otsuki | |
| 5,144,507 | 9/1992 | Kurita | 360/74.1 |
| 5,316,237 | 5/1994 | Schalfler | |
| 5,506,741 | 4/1996 | Kido | 360/74.2 |

FOREIGN PATENT DOCUMENTS

| | | | |
|---|---|---|---|
| 56-140537 | 2/1981 | Japan | 242/333.6 |

Primary Examiner—John P. Darling
Attorney, Agent, or Firm—Mark Mollon

[57] ABSTRACT

A cassette tape transport mechanism is provided with a mechanism for quickly detecting the stoppage of a take-up reel, thereby causing a tape direction change cycle to be initiated before a significant amount of tape can form a jam during a tape eating condition. The number of tape direction changes within a predetermined time is also counted and compared to a reference limit to detect a tape eating malfunction. The tape may be automatically ejected and an error message sent to the taper player display, allowing the user to clean the cassette or the player mechanism to remove sticky substances that may be causing the tape eating condition.

8 Claims, 4 Drawing Sheets

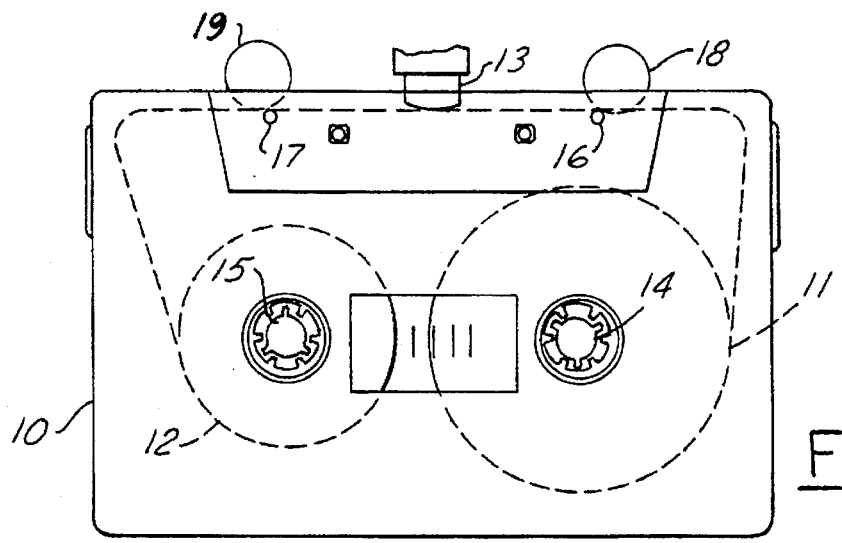
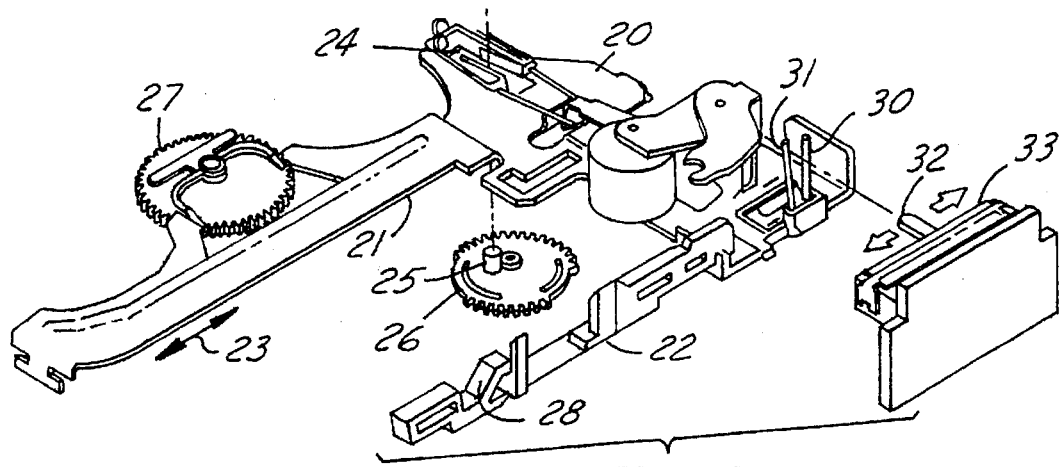
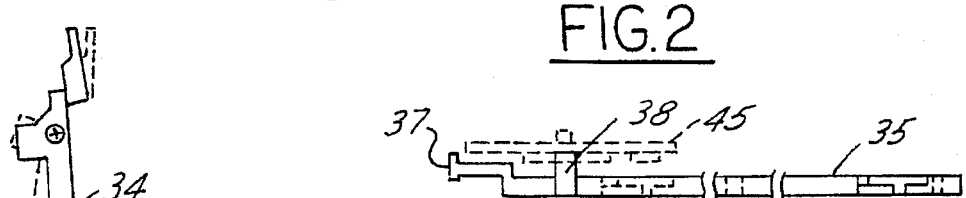
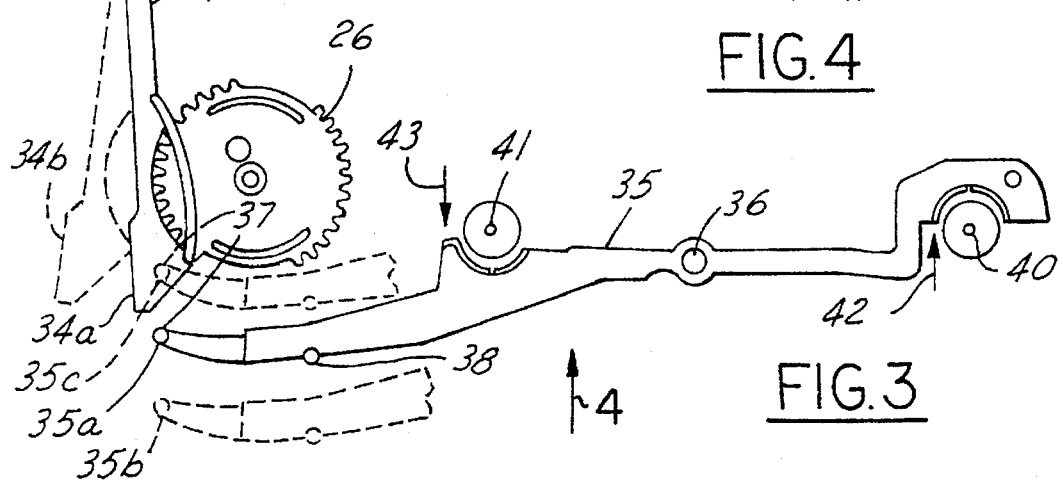

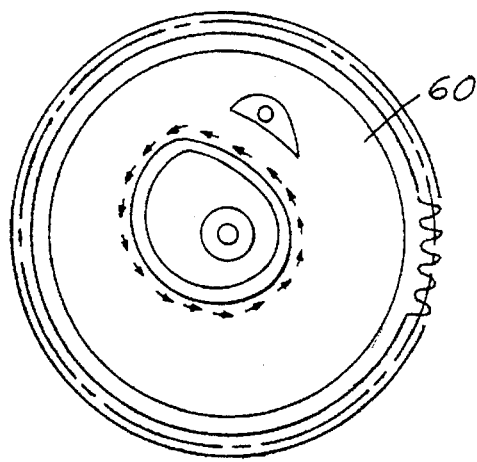
(PRIOR ART) FIG.10
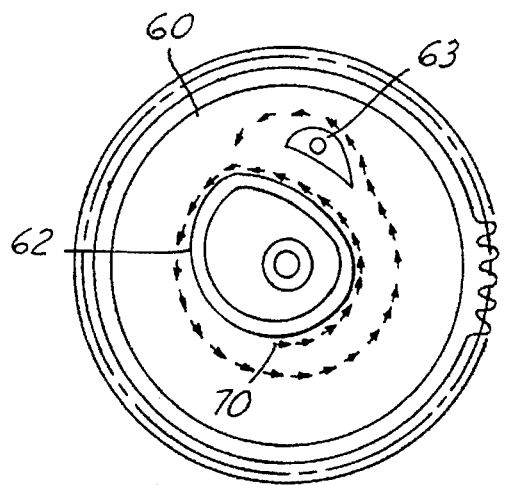
FIG.11 (PRIOR ART)
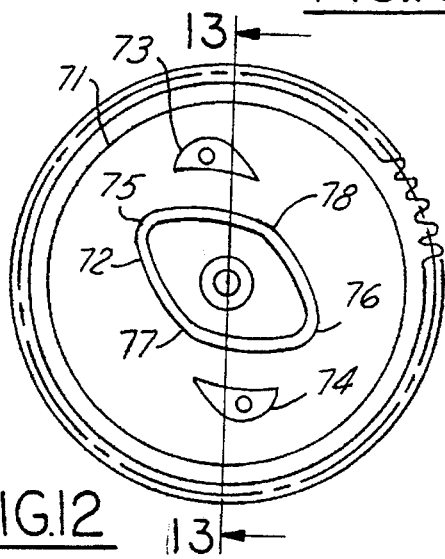
FIG.12
FIG.13
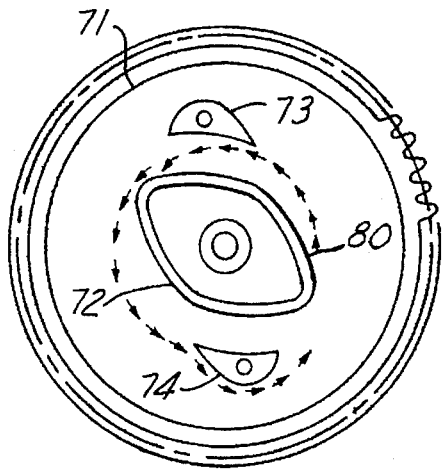
FIG.14
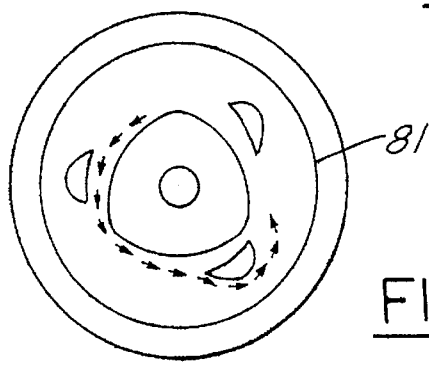
FIG.15

AUTOREVERSE CASSETTE TAPE MECHANISM WITH TAPE-EATING PREVENTION

BACKGROUND OF THE INVENTION

The present invention relates in general to autoreverse cassette tape mechanisms and more specifically to detection of a condition potentially leading to a jamming of tape at the pinch roller and/or capstan.

An autoreverse cassette tape player reproduces signals from both sides of a cassette without having to remove the tape from the player in order to turn it over. In such a player, the drive mechanism must be able to drive the tape in either direction. A magnetic head for picking up signals from the tape typically moves up and down to be located over the portion of the tape having the recorded signals, or separate pick-ups may be provided.

During playback, cassette tape is drawn from a supply reel past the magnetic head to the take-up reel using a capstan and pinch roller to draw the tape at a constant speed. The take-up reel is driven in the proper direction to store tape that has been drawn past the magnetic head. When the autoreverse mechanism changes direction, the supply and take-up reels are reversed and a separate capstan and pinch roller pair on the opposite side of the magnetic head assumes the job of drawing the tape past the head.

A well known problem referred to as "tape eating" can occur during tape playback whenever the tape becomes jammed in the vicinity of the capstan and pinch roller. For example, tape may stick to the rotating capstan and become wound on the capstan. Both the cassette tape and the cassette mechanism can become damaged by jamming. Further damage can occur when attempting to eject a jammed tape. The mechanism may even become so jammed that the tape cannot be ejected.

During normal tape playback in an autoreverse mechanism, tape direction is automatically reversed when the end of one side of the tape is reached. The end of tape condition is sensed when the take-up reel stops rotating in the take-up direction. A tape direction change cycle typically takes about 2 seconds to be completed.

During a tape-eating condition, the take-up reel stops moving just as though the end of the tape had been reached. Thus, a tape-eating condition also results in a tape direction change cycle. However, during a tape-eating condition the pinch roller and capstan continue eating tape, which forces the supply reel to keep supplying tape for the duration of the tape direction change cycle. During the 2 seconds it takes for the mechanism to change direction, as much as 2 inches of tape may be eaten by the pinch roller and capstan, thereby not permitting the tape mechanism to recover its normal operating condition after the direction change.

SUMMARY OF THE INVENTION

The present invention has two primary advantages in that 1) a tape-eating condition is prevented by speeding up the direction change cycle, and 2) a persistent tape-eating condition is detected and the mechanism is stopped in time to reduce the possibility of damage to the mechanism or to the tape.

In one aspect of the invention, a direction change cycle is obtained quickly in a bi-directional tape transport mechanism having an end-detector lever swingably mounted to a pivot point. The end-detector lever has a drive end and a cam follower member. A take-up reel includes means for urging the end-detector lever in a first direction when the take-up reel rotates in a predetermined turning direction. A trigger arm is responsive to a force from the drive end of the end-detector lever for initiating a direction change of the bi-directional tape transport mechanism. A cam carrier continuously rotates in a single direction during operation of the bi-directional tape transport mechanism. The cam carrier includes a 360° continuous cam surface having a variable radius between an inner radial limit and an outer radial limit. The cam carrier includes a plurality of deflection cams radially spaced from the continuous cam surface and rotationally offset from where the continuous cam surface reaches the outer radial limit. The deflection cams each have a respective deflection cam surface extending from less than the outer radial limit to greater than the outer radial limit. The cam follower member follows the 360° continuous cam surface while the end-detector lever is urged in the first direction and otherwise leaves the 360° continuous cam surface to follow one of the deflection cam surfaces to force the drive end of the end-detector lever against the trigger arm.

BRIEF DESCRIPTION OF THE DRAWINGS

FIG. 1 is a top view showing the relationship between a cassette tape cartridge and the capstan, pinch roller, and magnetic head of a tape mechanism.

FIG. 2 is a perspective view showing mechanisms involved in direction change of the tape mechanism.

FIG. 3 shows a partial top view of an end-detector lever, change-over gear, and trigger arm.

FIG. 4 is a side view of the end-detector lever and cam carrier gear.

FIG. 10 illustrates the path of a cam follower along the continuous cam surface prior to an end of tape condition.

FIG. 11 shows the prior art cam follower path during a direction change cycle.

FIG. 12 is an improved cam carrier gear according to the present invention.

FIG. 13 is a cross-sectional view along lines 13—13 of FIG. 12.

FIG. 14 illustrates a cam follower path for achieving a speeded-up direction change cycle according to the present invention.

FIG. 15 shows another embodiment of the cam carrier gear of the present invention.

DETAILED DESCRIPTION OF PREFERRED EMBODIMENTS

Figure 5:
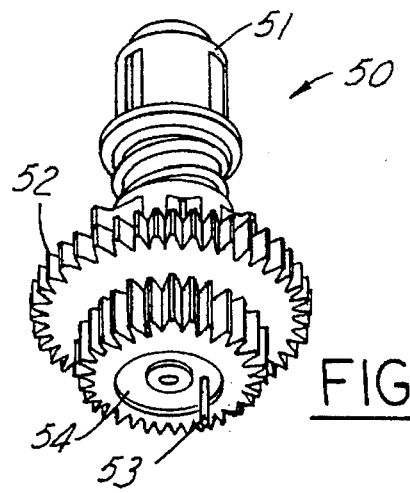
FIG. 5 is a bottom, front perspective view of a drive spindle.

Turning to FIG. 1, a cassette tape cartridge 10 is shown engaged with selected portions of a cassette tape player.

Cartridge 10 includes a reel 11 and a reel 12 having magnetic tape spooled on the reels and threaded through guides to be exposed to a magnetic playback head 13 of the tape player. The tape transport mechanism includes a spindle 14 and a spindle 15 engaging reels 11 and 12, respectively. One of reels 11 or 12 acts as a supply reel while the other reel acts as a take-up reel, depending upon the tape play direction. The transport mechanism further includes a capstan 16 and a capstan 17, a pinch roller 18 and a pinch roller 19. Tape is transported across head 13 by rotation of capstan 16 or 17 depending upon the direction of tape travel.

During normal tape playing, the take-up reel is also driven in the appropriate direction to take up tape after it is pulled across the head by the active capstan. However, in the event that a tape-eating malfunction occurs, the tape accumulates at the capstan either by wrapping around the capstan or bunching up in the area of the capstan and no tape is available for transporting to the take-up reel. Therefore, the take-up reel stops rotating or may even rotate in the reverse direction as tape is pulled backwards into the jam.

Although it is conventional to sense a stoppage of the take-up reel in order to sense the end of a tape and to then automatically reverse the travel of tape direction in order to play the other side of the tape, conventional tape decks are not constructed to detect the stoppage of rotation in a minimal amount of time because it is acceptable to allow several seconds before reversing the tape direction. However, a two second delay in changing direction can allow two inches of tape to be consumed in the tape jam.

The present invention operates on the principle that by speeding up the tape direction change cycle time, the eating of tape can be substantially prevented by not allowing sufficient tape to enter the jam. By reducing the amount of tape in a jam, the condition may be easily undone by the direction change. Furthermore, excessive changes in tape direction within a predetermined amount of time are used as an indication of a potential tape eating condition, whereupon corrective action such as ejection of the tape can be taken.

In order to illustrate typical hardware modifications for speeding up the detection of stoppage of a take-up reel, a tape direction change mechanism will be describe with reference to FIGS. 2–15. The example illustrates the application of the invention to a particular bi-directional tape transport mechanism sold by Tanashin Corporation. However, the principle of speeding up the direction change cycle can be adapted to any type of transport mechanism including full electronic (i.e. full logic) decks.

Referring to FIG. 2, the mechanism includes a main plate 20 having projecting arms 21 and 22. Main plate 20 and its projecting arms 21 and 22 are slideable in the direction of arrow 23 between two opposite positions, each corresponding to one direction of tape rotation. Main plate 20 includes a slot 24 that receives a post 25 extending from a change-over gear 26. Change-over gear 26 rotates between two positions corresponding to the end points of travel of main plate 20, thereby configuring the mechanism for driving the tape in either of its two directions. A gear 27 is shifted between its two positions by arm 21 for driving the one of the two spindles which is to be acting as a take-up reel in each particular tape direction.

Arm 22 includes a ramp 28 for causing the magnetic head to slide vertically between two positions for reading either the upper or lower tracks of the tape. In addition, arm 22 includes a pair of activator pins 30 and 31 for receiving an activator plunger 32 of an electrical switch 33 that senses the position of the main plate and thereby the direction of tape travel. Switch 33 provides a signal to a microprocessor (not shown in FIG. 2) that monitors the direction of tape play.

As shown in FIG. 3, the action of change-over gear 26 is controlled by a trigger arm 34 and an end-detector lever 35. Trigger arm 34 is urged into a first position 34a by a spring (not shown) in order to retain change-over gear 26 in a position corresponding to one direction to tape travel. Trigger arm 34 can be pushed by end-detector lever 35 into a second position 34b to thereby release change-over gear 26 to rotate one half turn and to place the mechanism in the other tape direction. Trigger arm returns to position 34a and a locking cam (not shown) on trigger arm 34 engages a locking surface (not shown) on change-over gear 26 at the end of the direction change cycle.

End-detector lever 35 pivots about pivot pin 36 and is swingable between positions 35b and 35c. As will be described in more detail below, end-detector lever 35 swings between positions 35a and 35b during normal tape playing. Under a condition where a tape direction change cycle is to take place, end-detector lever 35 undergoes a larger deflection to position 35c so that a drive end 37 of lever 35 deflects trigger arm 34 to position 34b.

Movement of end-detector lever 35 is controlled as follows. Spindles 14 and 15 are mounted on mounting pins 40 and 41, respectively, adjacent end-detector lever 35 on opposite sides of pivot pin 36. When either spindle 14 or 15 successfully rotates as a take-up reel, a force is applied (via a mechanism described below) in order to urge end-detector lever 35 toward position 35b by application of a force at points 42 or 43. End-detector lever 35 includes a cam follower member 38 projecting therefrom which engages a cam surface on a cam carrier gear (not shown in FIG. 3). During application of forces along lines 42 or 43 by a rotating take-up spindle, end-detector lever 35 swings between positions 35a and 35b in response to cam follower member 38 following a cam surface described below. However, when motion of the take-up reel ceases, the force along lines 42 or 43 also ceases and end-detector lever 35 is no longer urged toward position 35b. Thus, after being positioned at position 35a, end-detector lever 35 is motionless and remains at position 35a until a separate cam then deflects it to position 35c, thus initiating a direction change cycle.

FIG. 4 shows a side view of end-detector lever 35 and its relationship to cam carrier gear 45, shown in phantom. Cam follower 38 of end-detector lever 35 projects upward toward the lower surface of cam carrier gear 45 for deflection by cam surfaces on gear 45 as gear 45 rotates continuously during tape operation.

FIG. 5 shows a spindle 50 that is mounted on pins 40 and 41 of FIG. 3. Spindle 50 includes an upper hub 51 for engaging a reel of a tape cartridge and a gear 52 through which the spindle is driven when operating as a take-up reel. A push arm 53 extends from a clutch disk 54 mounted such that push arm 53 tends rotate along with spindle 50. Push arm 53 is installed adjacent the push areas 42 and 43 of end-detector lever 35 shown in FIG. 3 to urge end-detector lever 35 in the first direction when the take-up reel rotates in its take-up direction as described earlier.

Figure 6:
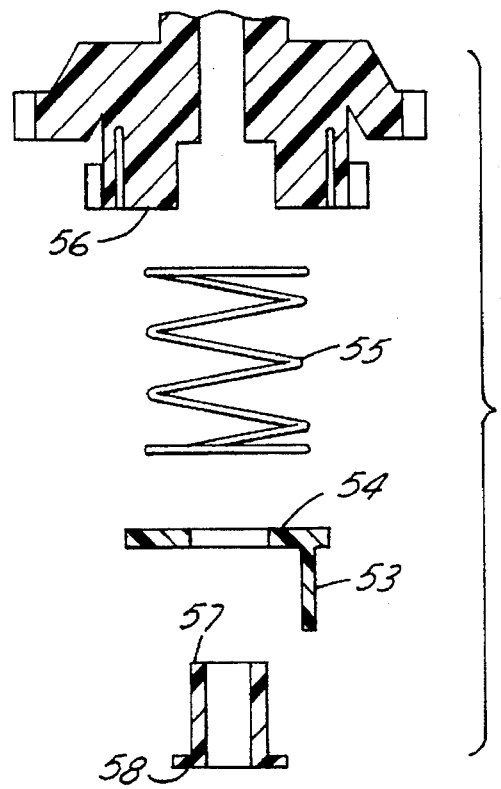
FIG. 6 is an exploded, side cross sectional view of the spindle of FIG. 5.

FIG. 6 shows an exploded, side cross-sectional view of the clutch mechanism. A spring 55 is compressed between clutch disk 54 and a spindle body 56. A cap 57 passes through a central aperture in disk 54 and is press fit into a central aperture in spindle body 56. Thus, clutch disk 54 is urged by spring 55 against a lip 58 on cap 57 causing a frictional force that supplies the force to urge the end-detector lever to pivot around its pivot point. Thus, when a spindle is rotating in its take-up position, the cam follower member on the end-detector lever follows an inner continuous cam surface on the cam carrier gear as will be described below.

Figure 8:
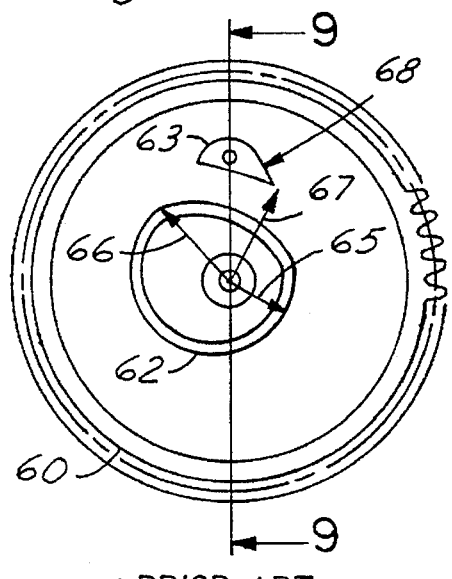
FIG. 8 shows prior art cam surfaces of a cam carrier gear.
Figure 7:
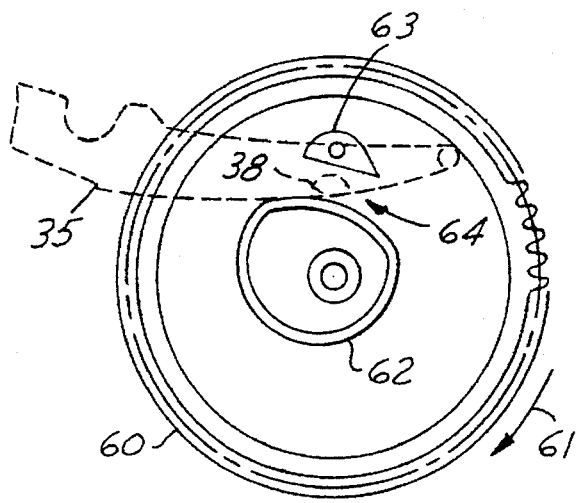
FIG. 7 shows the interaction of a cam carrier gear and an end-detector lever.
Figure 9:
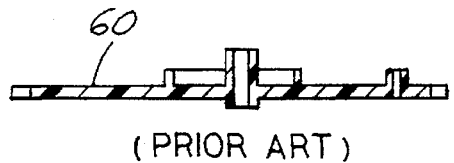
FIG. 9 is a side cross-sectional view of a cam carrier gear along line 9—9 of FIG. 8.

A prior art cam carrier gear 60 is shown in FIG. 7 as seen from the side of the gear that faces the end-detector lever. Gear 60 rotates in the direction indicated by arrow 61. A 360° continuous cam surface 62 has a variable radius between an inner radial limit and an outer radial limit. A deflection cam 63 is disposed on gear 60 radially disposed from continuous cam surface 62 providing a pathway 64 between the cams. End-detector lever 35 is shown in phantom with cam follower member 38 located in pathway As shown in FIG. 8, the cam surfaces on gear 60 maintain a particular inter-relationship. Thus, 360° continuous cam surface 62 has a variable radius between an inner radial limit 65 and an outer radial limit 66. Deflection cam 63 has a deflection surface 68 extending from a first radius 67 which is smaller than outer radial limit 66 out to a maximum radius which is greater than outer radial limit 66 and which is sufficient to cause deflection of the trigger arm. FIG. 9 shows gear 60 in cross section.

FIG. 10 shows the path traced by the cam follower member of the end-detector lever along the 360° continuous cam surface during normal playing operation of the tape transport mechanism.

FIG. 11 shows the path taken by the cam follower member when the take-up reel stops rotating at cam position 70. After rotation of the take-up reel stops, the cam follower member follows a path with only increasing radial distance from the center of cam carrier gear 60. After deflection by the continuous cam carrier at its outer radial limit, the cam follower member stays at a constant radius (equal to the outer radial limit) until it meets deflection cam 63. The cam follower member follows the deflection cam surface until the trigger arm is moved and a tape direction change cycle is initiated. When reverse rotation begins of the tape transport mechanism, the opposite spindle becomes a take-up reel and the end detector lever is again urged in the direction which causes the cam member to return to 360° continuous cam surface 62. However, as is apparent from FIG. 11, one and one-half rotations of gear 60 can occur between the stopping of a take-up reel and the initiation of a direction change cycle. Such a long delay causes an excessive amount of tape jam and the resulting tape jam may be to big to allow recovery when the mechanism reverses direction.

This problem of the prior art is corrected by the invention as shown in FIG. 12. A cam carrier gear 71 includes a continuous cam surface 72 and a pair of deflection cams 73 and 74. Continuous cam surface 72 reaches its outer radial limit at points 75 and 76, while it decreases to its inner radial limit at points 77 and 78. FIG. 13 shows cam carrier 71 in cross section.

FIG. 14 shows a worst case response time using cam carrier gear 71. Take up reel rotation stops at cam position 80 when the cam follower member is not at a sufficient radius to contact deflector cam 73. Therefore, it maintains a constant radius until it again meets continuous cam 72 and is deflected to the outer radial limit. It then contacts deflector cam 74 and a direction change cycle is initiated after about ¾ of a rotation of gear 71. On average, the delay between the stoppage of the take-up reel and the initiation of a direction change cycle is half as long as the response time using the prior art cam carrier gear.

A further improvement in response time is obtained using a cam carrier gear 81 as shown in FIG. 15 having a generally triangular-shaped continuous cam surface and three deflector cams.

A cam carrier gear may typically rotate one full rotation in about 0.9 seconds. Using this invention, the stoppage of take-up reel rotation is detected within 0.6 seconds or less. The response time of the tape transport direction changeover mechanism is such that the total time from stoppage of the take-up reel to the beginning of tape transport in the reverse direction is about 1 second or less.

Figure 16:
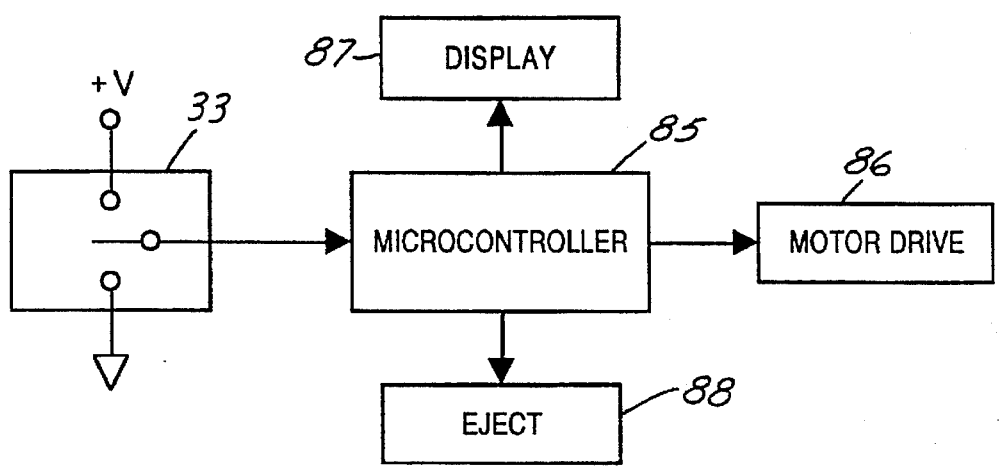
FIG. 16 is a block diagram showing how the transport mechanism of the present invention is controlled.

The operation of the invention as a whole will be described in more detail in connection with FIG. 16, wherein a microcontroller 85 coordinates operation of the cassette player. Microcontroller 85 is connected to a motor drive 86 for powering gear rotation and transport of a cassette tape. Microcontroller 85 is connected to switch 33 for sensing the direction of tape transport. Microcontroller 85 is further connected to a display 87 for informing a user of tape play direction and other information. Microcontroller 85 is further connected to an eject mechanism 88 for causing ejection of a cassette tape. Thus, during normal play of the tape mechanism, microcontroller 85 monitors changes of direction of tape play by inspecting the signal from switch 33 which indicates the direction of tape travel. In the event that a tape-eating condition occurs such that tape travel is not successful in either direction, microcontroller 85 detects the malfunction. Specifically, corrective action is taken by microcontroller 85 in the event that a predetermined number of direction change cycles occur within a predetermined amount of time. Such actions include stopping motor drive 86, displaying an error message on display 87, and/or ejecting the cassette tape via ejection mechanism 88.

Figure 17:
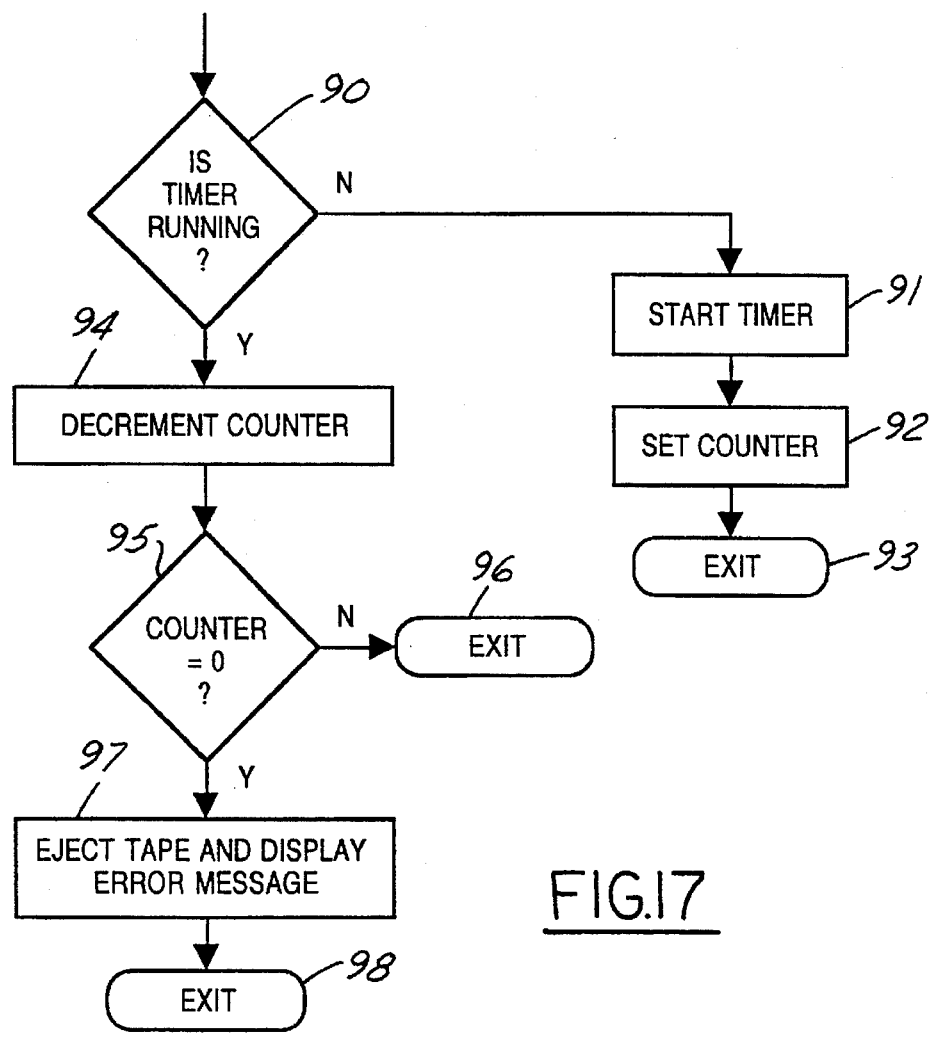
FIG. 17 is a flow chart showing a preferred method of the preset invention.

A specific method for determining a malfunction is shown in FIG. 17. FIG. 17 represents a subroutine which is executed each time a change is detected in the tape play direction from switch 33. In step 90 a check is made to determine whether a timer is running. If not, then the timer is started in step 91, a counter is set in step 92 and the subroutine is exited in step 93. If step 90 determines that the timer is already running, then the counter that was set in 92 is decremented by one in step 94. In step 95, a check is made to determine whether the counter has reached zero. If not, then the subroutine is exited in step 96. If the counter has reached zero, then corrective action is taken in step 97 such as ejecting the tape or displaying an error message such as "Tape Jam". Finally, the subroutine is exited in step 98.

In an preferred embodiment, the length of time that the timer may run is about 10 seconds and the value to which counter is set in step 92 equals 5.

As is apparent from the foregoing description, the invention prevents tape eating by changing tape directions when the take-up reel stops moving with a quick response time that prevents sufficient accumulation of tape in the tape jam to cause an unrecoverable malfunction. If a serious tape eating problem exists such that the reversal of tape play direction does not clear the problem, the invention detects excessive tape direction changes and shuts the transport mechanism down in sufficient time to prevent serious damage to the mechanism.

What is claimed is:

1. An autoreverse cassette tape player including a bi-directional tape transport mechanism, comprising:
   an end-detector lever swingably mounted at a pivot point, said end-detector lever having a drive end and a cam follower member;
   a take-up reel including means for urging said end-detector lever in a first direction when said take-up reel rotates in a predetermined turning direction;
   a trigger arm responsive to a force from said drive end of said end-detector lever for initiating a direction change of said bi-directional tape transport mechanism;

a cam carrier for continuously rotating in a single direction during operation of said bi-directional tape transport mechanism, said cam carrier including a 360° continuous cam surface having a variable radius between an inner radial limit and an outer radial limit, said cam carrier including a plurality of deflection cams radially spaced from said continuous cam surface and rotationally offset from where said continuous cam surface reaches said outer radial limit, said deflection cams each having a respective deflection cam surface extending from less than said outer radial limit to greater than said outer radial limit, said cam follower member following said 360° continuous cam surface while said end-detector lever is urged in said first direction and otherwise leaving said 360° continuous cam surface to follow one of said deflection cam surfaces to force said drive end of said end-detector lever against said trigger arm;

a direction sensor generating a direction signal that changes state after said direction change initiated by said trigger arm; and a microprocessor receiving said direction signal and detecting a malfunction when a predetermined number of changes in said direction signal occur within a predetermined time period.

2. The player of claim 1 wherein said microprocessor generates a tape eject signal in response to detection of said malfunction.

3. The player of claim 2 wherein said player includes an alphanumeric display for displaying an error message in response to detection of said malfunction.

4. A bi-directional tape transport mechanism comprising:

an end-detector lever swingably mounted at a pivot point, said end-detector lever having a drive end and a cam follower member;

a take-up reel including means for urging said end-detector lever in a first direction when said take-up reel rotates in a predetermined turning direction;

a trigger arm responsive to a force from said drive end of said end-detector lever for initiating a direction change of said bi-directional tape transport mechanism; and a cam carrier for continuously rotating in a single direction during operation of said bi-directional tape transport mechanism, said cam carrier including a 360° continuous cam surface having a variable radius between an inner radial limit and an outer radial limit, said cam carrier including a plurality of deflection cams radially spaced from said continuous cam surface and rotationally offset from where said continuous cam surface reaches said outer radial limit, said deflection cams each having a respective deflection cam surface extending from less than said outer radial limit to greater than said outer radial limit;

said cam follower member following said 360° continuous cam surface while said end-detector lever is urged in said first direction and otherwise leaving said 360° continuous cam surface to follow one of said deflection cam surfaces to force said drive end of said end-detector lever against said trigger arm.

5. The mechanism of claim 4 wherein said 360° continuous cam surface has a substantially elliptical shape and wherein there are two deflection cams.

6. The mechanism of claim 4 wherein said 360° continuous cam surface has a substantially rounded triangular shape and wherein there are three deflection cams.

7. An autoreverse cassette tape player including a bi-directional tape transport mechanism with capstans and pinch rollers to transport tape between a supply reel and a take-up reel, comprising:

an end of tape detector for producing an indication within a first predetermined time after said take-up reel stops rotating; and a change-over mechanism to reconfigure said tape transport mechanism so that it begins to transport tape in a reverse direction within a second predetermined time of receiving said indication from said end of tape detector, wherein a sum of said first predetermined time and said second predetermined time is less than or equal to about 1 second.

8. The player of claim 7 wherein said first predetermined time is less than or equal to about 0.6 seconds.

* * * * *